United States Patent

[11] 3,627,968

[72] Inventor   Kurt H. Sennowitz
                Royal Oak, Mich.
[21] Appl. No.  851,952
[22] Filed      Aug. 21, 1969
[45] Patented   Dec. 14, 1971
[73] Assignee   Elox Inc.
                Troy, Mich.
                Continuation-in-part of application Ser. No.
                723,726, Apr. 24, 1968, now abandoned.
                This application Aug. 21, 1969, Ser. No.
                851,952

[54] GAP SHORT CIRCUIT PROTECTIVE SYSTEM FOR ELECTRICAL DISCHARGE MACHINING
7 Claims, 1 Drawing Fig.

[52] U.S. Cl. .................................................... 219/69 C
[51] Int. Cl. ..................................................... B23b 1/08
[50] Field of Search ........................................ 219/69 C,
                                        69 F, 69 G, 69 P, 69 S

[56]                References Cited
                UNITED STATES PATENTS
3,018,411   1/1962    Webb ............................ 219/69 P X
2,769,078   10/1956   Matulaitis ..................... 219/69 S
3,435,176   3/1969    Lobur ........................... 219/69 G
3,483,347   12/1969   Losey ........................... 219/69 P Primary Examiner—R. F. Staubly
Attorney—Radford W. Luther ABSTRACT: A circuit is provided to sense gap condition for impending or actual short circuit condition. Responsive to such condition, a portion of the drive voltage for the gap output switch is fed back, stored, amplified and applied to control the circuit pulser to narrow pulse on-time. Additionally, a means is provided for varying the cutoff reference voltage conjointly with change in frequency being made to the pulser.

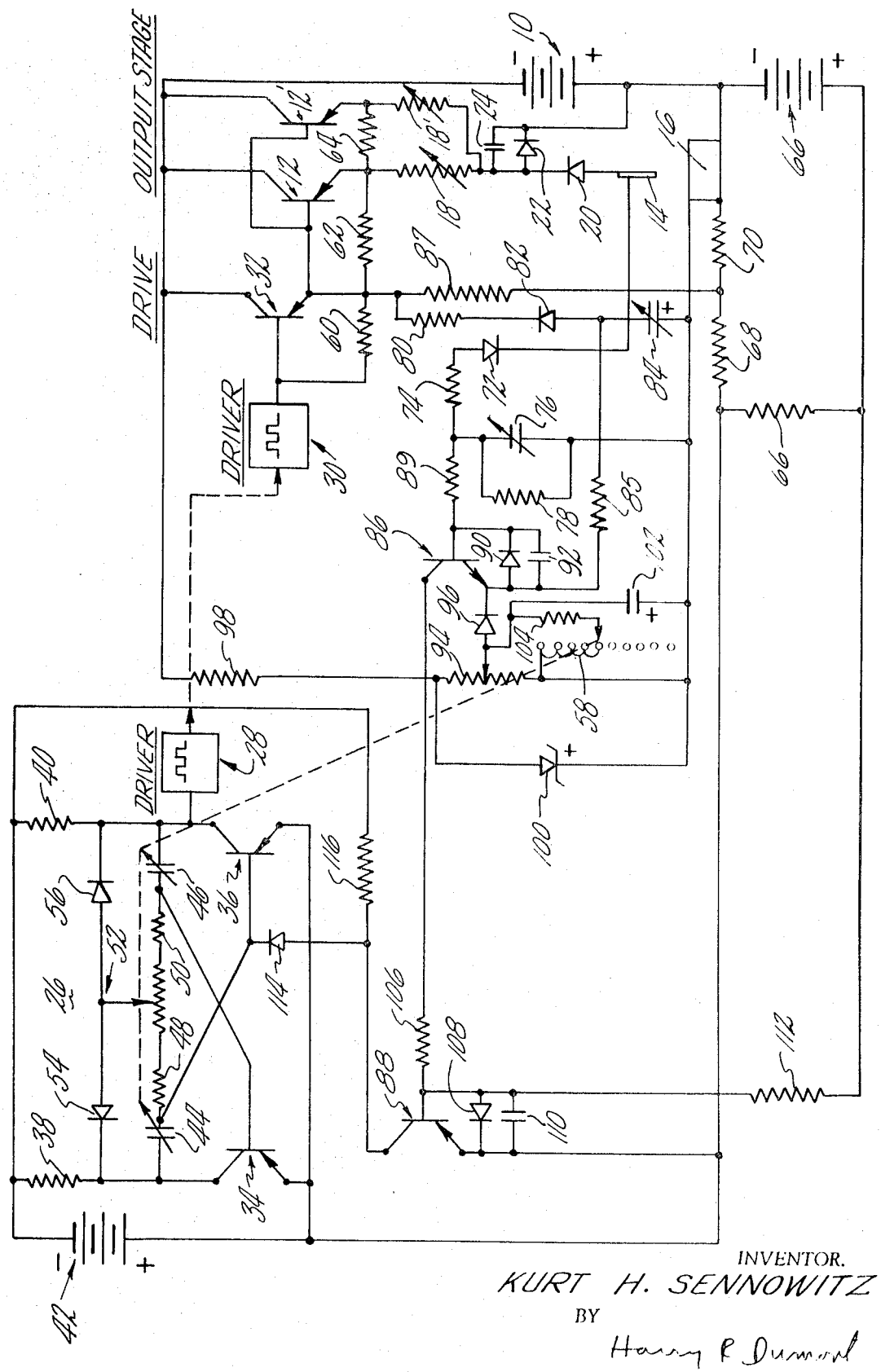

3,627,968

GAP SHORT CIRCUIT PROTECTIVE SYSTEM FOR ELECTRICAL DISCHARGE MACHINING

This application is a continuation-in-part of my copending U.S. application Ser. No. 723,726, entitled "Electrical Discharge Machining Pulse Control Apparatus," filed on Apr. 24, 1968, now abandoned. Said application discloses and claims one system for combined short circuit and open circuit pulse narrowing.

BACKGROUND OF THE INVENTION

The field to which my invention relates is that known as electrical discharge machining in which material is removed from an electrically conductive workpiece by the action of electrical gap discharges between a tool electrode and the workpiece. An electrode or workpiece servo feed system is used to provide relative movement to maintain an optimum gap spacing between electrode and workpiece as material is removed. A dielectric coolant is circulated and recirculated through the gap during machining operation. For most reliable and predictable results, a power supply circuit of the independent pulser type is utilized to provide machining pulses of precisely controllable frequency and on-off time.

During the machining operation, the gap may become bridged by workpiece particles to cause a condition known as gap short circuit. This condition is accompanied by excessive localized heat which tends to damage both electrode and workpiece unless corrective action is taken. Various systems have been devised to provide fast-acting servo withdrawal or complete interruption of current to the gap.

BRIEF DESCRIPTION OF THE DRAWING

The drawing is a combined schematic and block diagrammatic showing of an electrical discharge machining power supply circuit with a short circuit protective circuit according to my invention incorporated therein.

DESCRIPTION

Referring now to the drawing, the main machining power source 10 is shown connected with output stage transistors 12, 12' and in series with the machining gap comprising tool electrode 14 and workpiece 16. Gap current magnitude is controlled by resistors 18, 18'. Rectifier 20 is included in series between electrode 14 and the output stage transistors 12, 12' to permit high gap voltage operation without damage to these transistors. Diode 22 and capacitor 24 are included to clamp transistors 12, 12' to the positive DC supply 10 to eliminate high-voltage spikes.

Multivibrator stage 26 and driver stages 28, 30 and 32 are used to pulse the output stage transistors 12, 12'. In the interest of simplification, stages 28, 30 have been shown in block form.

Included in multivibrator 26 are a pair of transistors 34, 36, biased and coupled for alternate operation in the astable multivibrator mode. Transistors 34 and 36 are connected respectively through load resistors 38 and 40 to the negative terminal of DC source 42. Cross coupling capacitors 44, 46 are adjustable by ganged control and cross couple the collectors of transistors 34, 36 each to the opposing transistor base. Limiting resistors 48, 50 and potentiometer 52 are included in the multivibrator circuit with the on-off time, i.e. pulse width, controlled by the setting of potentiometer 52. Blocking diodes 54, 56 are connected as shown in circuit with the movable contact of potentiometer 52. The frequency of the multivibrator operation and hence of the machining power pulses furnished to the gap may be selectively altered by changing the values of capacitors 44, 46 by a ganged switch as indicated by the dashlines between those capacitors. A further dashline is shown between capacitor 46 and tap switch 58 to provide for automatic control of reference voltage level responsive to change of multivibrator operating frequency. The importance of this feature will be explained more fully hereinafter in the section "Description of Operation." The pulse output from multivibrator 26 is suitably amplified and resquared through intermediate drive stages 28, 30 and 32 to render output transistors 12, 12' alternately conductive and nonconductive to provide machining pulses to the gap. While the present invention employs transistors as electronic switches, the invention is not so limited but, with proper redesign of the circuit by one skilled in the art, any electronic switch may be substituted. Resistors 60, 62, 64 protect the base emitter junction of their respective transistors from excess turnoff voltage.

The remainder of the circuit shown in the drawing relates to the short circuit protection system. A bias source 66 is included with resistors 60, 68, 70 connected as a voltage divider. The sensing network connected to electrode 14 includes diode 72 which serves to store gap voltage through resistor 74 on capacitor 76 whose charge and discharge rate depends on the values of resistor 78 and capacitor 76. The setting of variable capacitor 76 is normally such to provide cutoff delay during roughing, high-current cutting and fast cutoff during finish cutting, especially when performed at high frequencies.

A separate network is connected to the drive stage comprising transistor 32. This network is designed to feed back, store and amplify a portion of the drive signal to provide pulse-narrowing operation on multivibrator 26, particularly with regard to transistor 36 which is the on-time control switch. Included in this network are resistor 80, diode 82 and capacitor 84. The drive signal taken from the emitter of transistor 32 charges capacitor 84 to the polarity shown. Resistor 85 with the reference voltage level across capacitor 84 determines the charge and discharge level and the time constant. Capacitor 84 is embodied as a variable capacitor to permit adjustment for the desired gap current during a gap short circuit condition or before the gap actually shorts, depending on the reference voltage adjustment. Load resistor 87 is connected between the emitter of transistor 32 and a positive voltage derived from bias source 66.

Actual control over machining power pulse duration is exercised through cutoff transistors 86 and 88. Resistor 89 is the drive-limiting resistor for transistor 86. Diode 90 protects the base to emitter junction of transistor 86 from excess turnoff voltage. Capacitor 92 prevents pretriggering of transistor 86 due to stray signals. Transistor 86 is in a nonconductive state so long as the negative electrode gap voltage on its base is more negative than the preset reference voltage on variable resistor 94 applied through holdoff diode 96 to its emitter. Resistor 98 is a part of the divider network across source 10. Zener diode 100 stabilizes the reference voltage while capacitor 102 provides a filter for the preset reference voltage. As has already been indicated, resistor 104 is switched across the preset portion of variable resistor 94 conjointly with each change made in frequency to the multivibrator by adjustment of capacitors 44, 46. I have found that certain electrode materials cut a great deal more efficiently when a lower cutoff reference voltage is used along with the higher frequency settings of multivibrator 26.

The cutoff transistor 86 has its collector connected to the base of transistor 88 through drive-limiting resistor 106. Diode 108 is a protective diode for the base to emitter junction while capacitor 110 filters out stray pickup to prevent pretriggering of transistor 88. Resistor 112 applies a positive bias signal across the emitter-base junction of transistor 88 during its off-time. Diode 114 isolates the cutoff circuit from the base of transistor 36 during normal machining operation. Resistor 116 is connected to the negative terminal of source 42 and to the rectifier 114, transistor 88 collector junction to insure normal multivibrator operation during cutting and gap open circuit condition.

DESCRIPTION OF OPERATION

The description of operation will now be made with special attention given to the short circuit protective circuit and its functioning. During rough machining, multivibrator 26 is preset through potentiometer 52 to provide high-current, long on-time pulses. The on-time of the machining pulses is controlled through the conduction of transistor 36 while the off-time is controlled through the conduction of transistor 34. During this mode of operation, variable capacitor 76 is adjusted to give a relatively large cutoff delay period. This serves to improve cutting stability and improve metal removal. During the initial open arc condition when the electrode 14 is being advanced toward the workpiece 16 to start cutting and during normal gap-cutting condition, transistor 86 is in its nonconducting state. The negative arc voltage taken from electrode 14 and peak stored on capacitor 76 is applied to the base of transistor 86. Since the applied voltage is more negative than the reference voltage applied to its emitter, it will stay off. During this period, transistor 88 is also nonconducting, so that the multivibrator is not affected in its operation.

When a gap short circuit actually occurs or is impending, the gap voltage will drop below the preset reference voltage applied to the emitter of transistor 86. When the base is rendered more positive than the emitter, transistor 86 will be rendered conductive. This will apply a negative signal to the base of PNP-transistor 88 to turn it on. In its conductive state, transistor 88 will place a positive signal on the base of transistor 36 through diode 114 to turn it off. Since transistor 36 controls machining pulse on-time, the pulses will be substantially narrowed. The multivibrator never stops operating, only its frequency and gap on-time are changed just before and during the gap short circuit condition. An adjustable delay is exercised through the discharge of capacitor 84 through resistor 85 into the emitter of transistor 86. This will turn transistor 86 off for a short period during the initial part of the gap short circuit condition and delay the pulse-narrowing effect. When roughing is completed, multivibrator 26 is changed to operate at a much higher frequency for finishing the cut. As capacitors 44, 46 are adjusted for the lower pulse frequencies, resistor 104 is switched across the preset portion of variable resistor 94 to provide a relatively low cutoff reference voltage. For the higher frequency setting resistor 104 is disconnected from across variable resistor 94 to provide a relatively high reference voltage. During the finishing operation, little or no cutoff delay is desirable and capacitor 84 is usually adjusted accordingly.

It will thus be seen that I have provided a novel and improved circuit for gap short circuit protection.

I claim:

1. In an apparatus for machining a conductive workpiece by passing machining power pulses across a dielectric coolant filled gap between a tool electrode and the workpiece, an electronic output switch operatively connected in series with a power supply across said gap, a pulsing means of variable on-off time for turning said switch on and off to provide said machining power pulses, at least one drive stage operatively connected between said pulsing means and said switch, an electronic cutoff switch operatively connected between said gap and said pulsing means for controlling its on-off time, means for sensing a gap short circuit condition operatively connected between said gap and said cutoff switch for enabling it responsive to said condition, said sensing means comprising a peak voltage storing network, and a feedback network operatively connected between said drive stage and said cutoff switch to operate said cutoff switch and reduce said on-time of said pulsing means responsive to said condition.

2. The combination as set forth in claim 1 wherein said feedback network comprises a variable time constant RC network, said RC network being diode coupled between the output of said drive stage and the control network of said cutoff switch.

3. In an apparatus for machining a conductive workpiece by passing machining power pulses across a dielectric coolant filled gap between a tool electrode and the workpiece, an electronic output switch operatively connected in series with a power supply across said gap, a pulsing means of variable on-off time for turning said switch on and off to provide said machining power pulses, at least one drive stage operatively connected between said pulsing means and said switch, an electronic cutoff switch operatively connected between said gap and said pulsing means for controlling its on-off time, means for sensing a gap short circuit condition operatively connected between said gap and said cutoff switch for enabling it responsive to said condition. Said sensing means comprising a diode-capacitor network for storing peak gap voltages and including a variable time constant RC network for delay adjustment, and a feedback network operatively connected between said drive stage and said cutoff switch to operate said cutoff switch and reduce said on-time of said pulsing means responsive to said condition.

4. In an apparatus for machining a conductive workpiece by passing machining power pulses across a dielectric coolant filled gap between a tool electrode and the workpiece, an electronic output switch operatively connected with a power supply across said gap, a pulsing means of variable on-off time for turning said switch on and off to provide said machining power pulses, at least one intermediate drive stage operatively connected between said pulsing means and said switch, an electronic cutoff switch operatively connected between said gap and said pulsing means for reducing its on-time, said cutoff switch having a pair of power electrodes and a control electrode, one of said power electrodes operatively connected to and controlling said pulsing means, a feedback network including a controllable delay stage connected between said drive stage and the other of said power electrodes of said cutoff switch for operating it, and a gap short circuit sensing network comprising a peak voltage storage network including a unidirectional current conducting device and a capacitor, said sensing network operatively connected between said gap and said control electrode of said cutoff switch for enabling it responsive to said condition.

5. In an apparatus for machining a conductive workpiece by passing machining power pulses between a tool electrode and said workpiece across a dielectric coolant filled gap, a power supply, an electronic output switch having a control electrode and a pair of power electrodes, said power electrodes operatively connected between said power supply and said gap for providing machining power pulses thereto, a multivibrator comprising a pair of switches biased and coupled for alternate operation, a drive stage coupled between the output of said multivibrator and the control electrode of said switch for operating it with predetermined on-off time, a feedback circuit connected between the output signal of said drive stage for providing a control signal to the appropriate one of said multivibrator switches to reduce the on-time of said pulses, and a gap short circuit sensing network comprising a gap peak voltage storage network operatively connected between said gap and said feedback circuit for operating it responsive to gap short circuit condition.

6. In an electrical discharge machining apparatus including an electronic switch operatively connected with a power supply across a machining gap, a pulsing means of variable frequency and variable on-off time operatively connected to said switch for operating it to provide machining power pulses across said gap, the improvement comprising a cutoff means including a preset reference voltage operatively connected between said gap and said pulsing means for reducing the on-time of said pulses responsive to gap short circuit condition, a drive stage operatively connected between said pulsing means and said switch for amplifying and resquaring said pulses from said pulsing means, said cutoff means operatively connected to the output of said drive stage for operation responsive to said condition, and a peak voltage sensing network coupled between said gap and said cutoff means for providing a signal thereto responsive to said condition.

7. The combination as set forth in claim 6 wherein a delay stage is included in said cutoff means, said delay period adjustable to provide maximum delay during relatively long on-time, low-frequency rough machining and to provide minimum delay during relatively short on-time, high-frequency finish machining.

* * * * *